United States Patent
Noumura et al.

(10) Patent No.: US 8,473,154 B2
(45) Date of Patent: Jun. 25, 2013

(54) VEHICLE CONTROL SYSTEM AND VEHICLE CONTROL METHOD

(75) Inventors: Shin Noumura, Susono (JP); Ken Koibuchi, Hadano (JP); Kaiji Itabashi, Gotenba (JP); Keisuke Takeuchi, Susono (JP); Toshio Tanahashi, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 13/221,257

(22) Filed: Aug. 30, 2011

(65) Prior Publication Data

US 2012/0053789 A1    Mar. 1, 2012

(30) Foreign Application Priority Data

Aug. 30, 2010 (JP) ................. 2010-192524

(51) Int. Cl.
G06F 7/00 (2006.01)

(52) U.S. Cl.
USPC .............. 701/37; 701/1; 701/29.4; 701/32.7; 701/41; 701/45; 180/167; 180/197; 280/5.5; 280/5.507; 700/280; 73/117.03; 381/71.11; 303/291

(58) Field of Classification Search
USPC .... 701/1, 29.4, 32.7, 37, 41, 45, 70; 180/167, 180/197; 280/5.5, 5.507; 700/280; 73/117.03; 381/71.11; 303/191
See application file for complete search history.

(56) References Cited

U.S. PATENT DOCUMENTS

| | | | | |
|---|---|---|---|---|
| 5,558,414 A | * | 9/1996 | Kubota | 303/122.08 |
| 6,895,317 B2 | * | 5/2005 | Yasui et al. | 701/36 |
| 6,941,213 B2 | * | 9/2005 | Yasui et al. | 701/80 |
| 7,171,296 B2 | * | 1/2007 | Kato et al. | 701/70 |
| 7,600,762 B2 | * | 10/2009 | Yasui et al. | 280/5.51 |
| 7,885,750 B2 | * | 2/2011 | Lu | 701/90 |
| 8,019,520 B2 | * | 9/2011 | Osaki et al. | 701/69 |
| 2007/0265752 A1 | * | 11/2007 | Hayama et al. | 701/41 |
| 2009/0088918 A1 | * | 4/2009 | Takenaka et al. | 701/29 |

FOREIGN PATENT DOCUMENTS

| | | |
|---|---|---|
| JP | A-05-071375 | 3/1993 |
| JP | A-06-249007 | 9/1994 |
| WO | WO 2011/021084 A2 | 2/2011 |
| WO | WO 2011/021088 A1 | 2/2011 |
| WO | WO 2011/021089 A2 | 2/2011 |
| WO | WO 2011/021090 A2 | 2/2011 |
| WO | WO 2011/021634 A1 | 2/2011 |

* cited by examiner

Primary Examiner — Mary Cheung
Assistant Examiner — McDieunel Marc
(74) Attorney, Agent, or Firm — Oliff & Berridge, PLC

(57) ABSTRACT

A vehicle control system, which is configured to obtain an index on the basis of a running condition of a vehicle and to change at least any one of a driving force control characteristic and a vehicle body support characteristic of a suspension mechanism in response to the index, is configured to acquire information associated with a friction coefficient of a road surface on which the vehicle runs, and to correct the at least any one of the driving force control characteristic and the vehicle body support characteristic, which is changed in response to the index, on the basis of the information associated with the friction coefficient of the road surface.

5 Claims, 7 Drawing Sheets

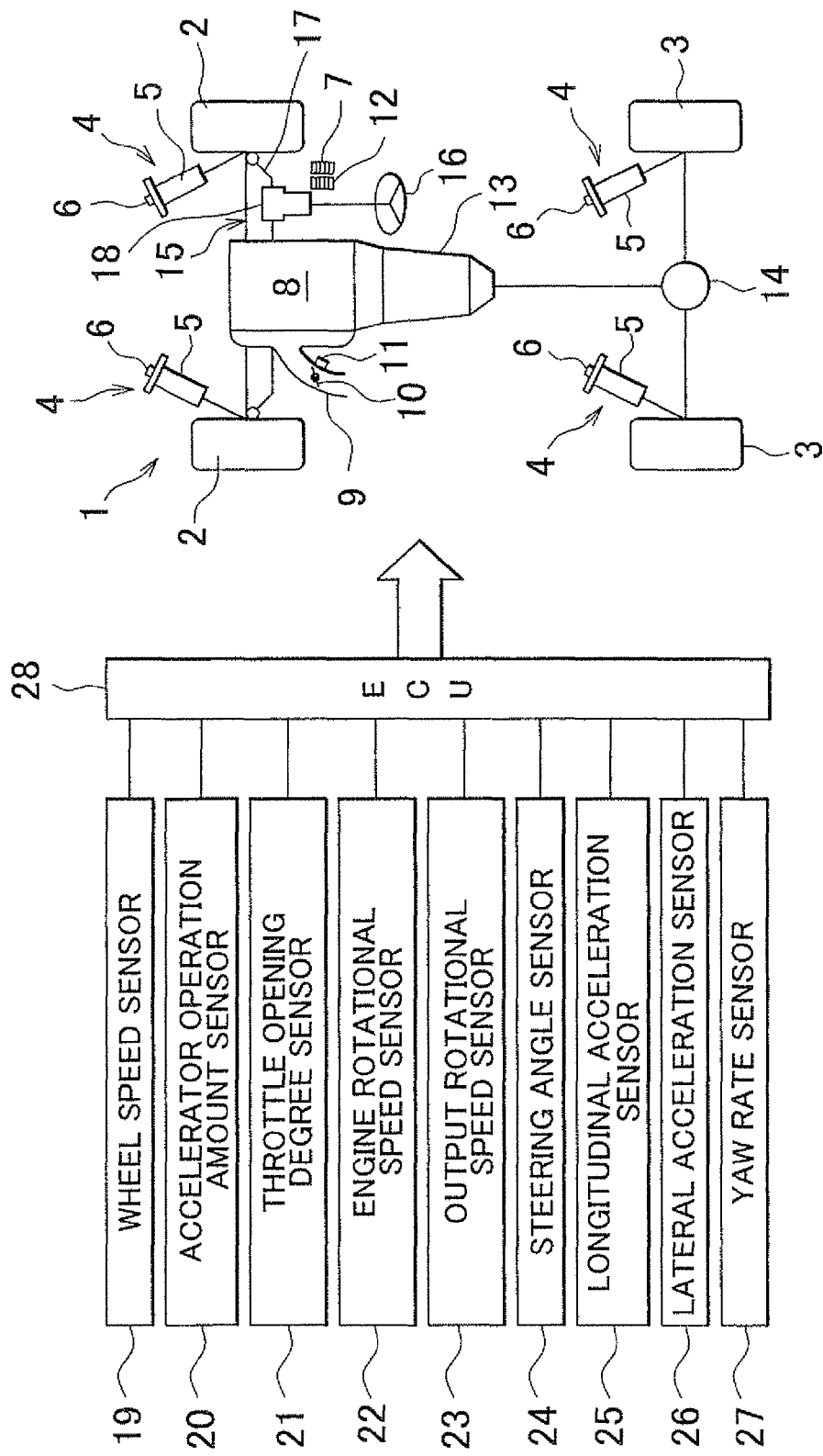

VEHICLE CONTROL SYSTEM AND VEHICLE CONTROL METHOD

INCORPORATION BY REFERENCE

The disclosure of Japanese Patent Application No. 2010-192524 filed on Aug. 30, 2010 including the specification, drawings and abstract is incorporated herein by reference in its entirety.

BACKGROUND OF THE INVENTION

1. Field of the Invention

The invention relates to a vehicle control system that is configured to adapt the behavior characteristics or acceleration and deceleration characteristics (hereinafter, referred to as running characteristics) of a vehicle, such as the power characteristics, steering characteristics and suspension characteristics of a vehicle, to a running environment of the vehicle, the taste and running intention of a driver, or the like, and a vehicle control method that uses the vehicle control system.

2. Description of Related Art

The behavior of a vehicle, such as a vehicle speed and a running direction, varies when a driver performs accelerating or decelerating operation or steering operation. The correlation between an operation amount and a variation in behavior depends on not only an energy efficiency, such as fuel economy, but also characteristics, such as ride comfort, quietness and power performance required of the vehicle. On the other hand, there are various environments in which vehicles run, such as urban areas, expressways, ascending roads and descending roads, and there are various tastes of drivers and various impressions that drivers experience from vehicles. Therefore, even when a vehicle is able to run in line with expectations for a specific running environment and/or a specific driver, but when the running environment or the driver is changed, the vehicle may not run in line with expectations and may give the driver the impression that excessive operation is required or so-called drivability may deteriorate.

Then, in an existing art, there have been suggested various devices that are configured to incorporate driving orientation into behavior control over a vehicle. The device of this type requires no switch operation and allows minute characteristic changes. One example of that device is described in Japanese Patent Application Publication No. 06-249007 (JP-A-06-249007). The device described in JP-A-06-249007 is a driving force control system that uses a neurocomputer. The device is configured to learn the correlation of an acceleration against an accelerator stroke and a vehicle speed as a required acceleration model and then compute a throttle opening degree on the basis of a deviation between the required acceleration model and a second reference acceleration model that incorporates driving orientation and a deviation between the second reference acceleration model and a standard first reference acceleration model.

Note that a situation that the vehicle runs as intended is based on sufficient grip between tires and a road surface. In other words, because the vehicle runs under constraints of tire's grip, the invention described in Japanese Patent Application Publication No. 05-071375 (JP-A-05-071375) is configured to prepare a throttle opening degree map for each of a normal mode and a sporty mode and then correct a target throttle opening degree obtained from the maps on the basis of a road surface friction coefficient (hereinafter, referred to as road surface $\mu$).

The device described in JP-A-06-249007 is configured to incorporate driver's driving orientation into driving force control to increase driving force; whereas, the device described in JP-A-05-071375 is configured to incorporate a road surface $\mu$ into throttle opening degree control to relatively decrease driving force (or engine output torque) in order to ensure tire's grip on a road surface. If these devices having opposite control details are merely applied to a vehicle, vehicle running control cannot always be executed sufficiently, so there is room for developing a new technique.

SUMMARY OF THE INVENTION

The invention provides a vehicle control system and vehicle control method that are able to improve drivability by better incorporating a driving orientation and a road surface friction coefficient into vehicle running control.

A first aspect of the invention relates to a vehicle control system that is configured to obtain an index on the basis of a running condition of a vehicle and to change at least any one of a driving force control characteristic and a vehicle body support characteristic of a suspension mechanism in response to the index. The vehicle control system is configured to acquire information associated with a friction coefficient of a road surface on which the vehicle runs, and to correct the at least any one of the driving force control characteristic and the vehicle body support characteristic, which is changed in response to the index, on the basis of the information associated with the friction coefficient of the road surface.

In addition, in the vehicle control system, both the driving force control characteristic and the vehicle body support characteristic may be corrected on the basis of the information associated with the friction coefficient of the road surface, and, when the driving force control characteristic is corrected to change in a direction opposite to a direction in which the driving force control characteristic is changed on the basis of the index, the vehicle body support characteristic may be corrected to change in the same direction as the direction in which the vehicle body support characteristic is changed on the basis of the index.

In addition, in the vehicle control system, the information associated with the friction coefficient of the road surface may include at least one of information that indicates a variation in the detected friction coefficient, information that indicates that a switch for selecting a running mode prepared for the vehicle to run on a road of which a road surface has a low friction coefficient is operated and information that indicates that a prestored friction coefficient is loaded.

In addition, in the vehicle control system, the index may be increased when an instantaneous index corresponding to an absolute value of an acceleration of the vehicle is larger than a current index, and may be decreased when a state where the instantaneous index corresponding to the absolute value of the acceleration of the vehicle does not exceed the current index continues and then a predetermined condition is satisfied, and the at least any one of the driving force control characteristic and the vehicle body support characteristic, which is corrected on the basis of the information associated with the friction coefficient of the road surface, may be held until the index is decreased below a corrected value.

A second aspect of the invention relates to a vehicle control method. The vehicle control method includes: obtaining an index on the basis of a running condition of a vehicle; changing at least any one of a driving force control characteristic and a vehicle body support characteristic of a suspension mechanism in response to the index; acquiring information associated with a friction coefficient of a road surface on which the vehicle runs; and correcting the at least any one of the driving force control characteristic and the vehicle body support characteristic, which is changed in response to the index, on the basis of the information associated with the friction coefficient of the road surface.

According to the aspects of the invention, not only the running condition of the vehicle may be incorporated into the driving force control characteristic or the vehicle body support characteristic but also at least any one of those characteristics is corrected on the basis of the friction coefficient of a road surface, so it is possible to achieve running by taking advantage of the driving force control characteristic or vehicle body support characteristic based on the running condition of the vehicle as much as possible. In addition, for example, when the friction coefficient of a road surface decreases and then the driving force control characteristic is corrected so as to relatively decrease driving force, the vehicle body support characteristic may be corrected in a direction opposite to this, that is, a direction in which the vehicle body support characteristic is set at the time when driving force is increased, so, even when the friction coefficient of a road surface decreases, it is possible to achieve running that is close to running intended by a driver as much as possible. Furthermore, according to the aspects of the invention, the at least any one of the characteristics based on the index is kept until a predetermined condition is satisfied, so it is possible to avoid or prevent a situation that the running characteristic frequently varies, correction of the characteristic delays against a variation in the friction coefficient of a road surface, or the like.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 7 is a view that schematically shows a vehicle to which the embodiment of the invention may be applied.

DETAILED DESCRIPTION OF EMBODIMENTS

Figure 1:
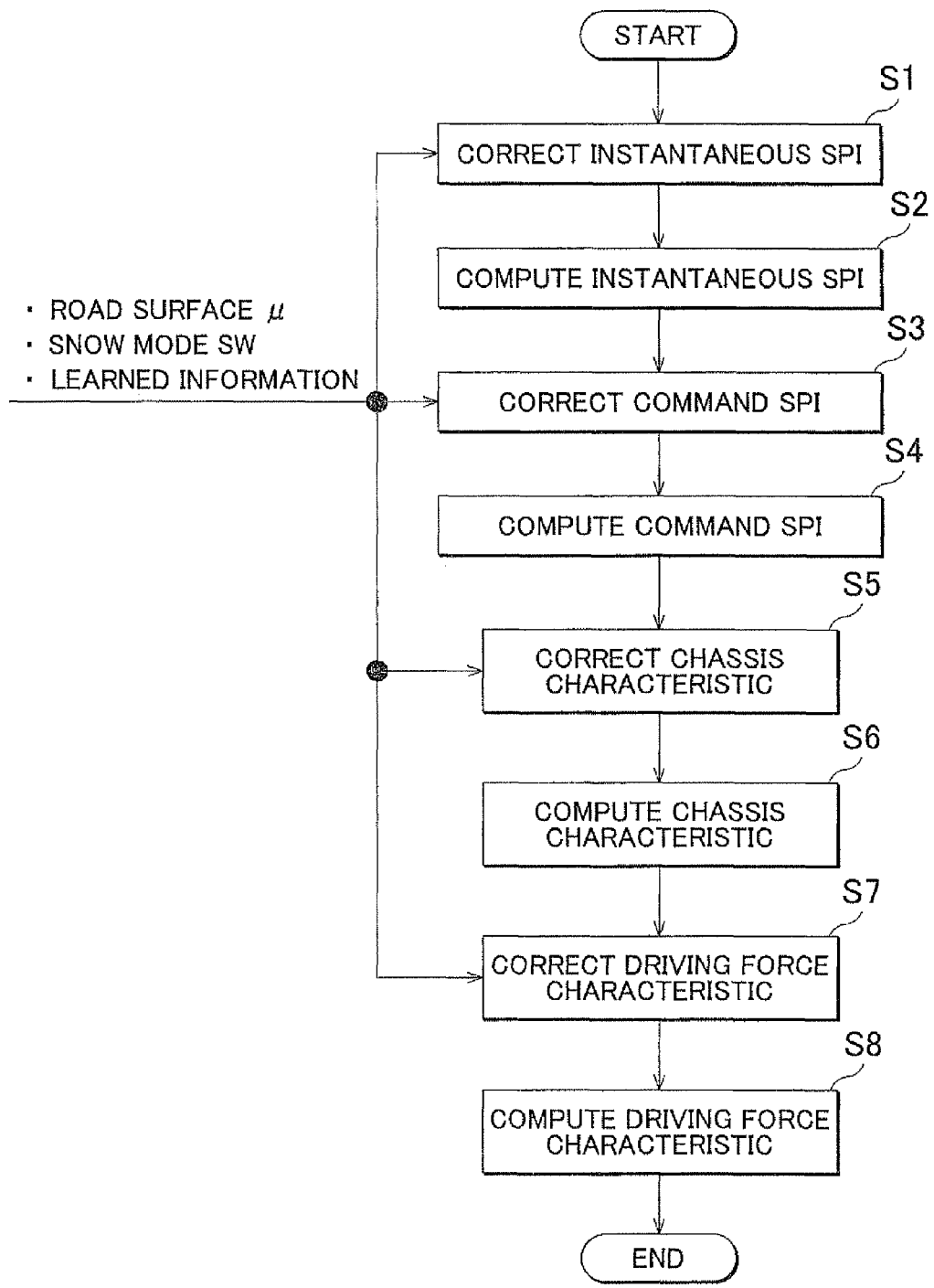
FIG. 1 is a flowchart that conceptually shows an example of control executed by a control system according to an embodiment of the invention.

A control system according to a specific example of the invention is configured to obtain an index on the basis of the running condition of a vehicle and to change the running characteristic of the vehicle on the basis of the index. The running condition may be an acceleration or the absolute value of the acceleration as an example, so the running condition may be an index that increases as the vehicle performs so-called sporty running. In addition, the acceleration is not limited to a longitudinal acceleration. The acceleration may be an acceleration that incorporates a lateral acceleration. More specifically, the acceleration may be a resultant acceleration that combines a longitudinal acceleration and a lateral acceleration. By so doing, not only the behavior of the vehicle through accelerator operation and brake operation but also the behavior through steering operation may be better incorporated into the running characteristic. Note that the acceleration may be a so-called actual acceleration that is detected by a sensor or an acceleration that is estimated on the basis of an accelerator operation amount or a brake operation amount. Then, the above running characteristic is a characteristic associated with a behavior, such as the acceleration characteristic of a vehicle, the turning characteristic (or turning performance) in steering and the suspension characteristic (support characteristic or damper characteristic) of a vehicle body, provided by a suspension mechanism.

In the embodiment of the invention, the above acceleration is incorporated into an index, and the essence of the index indicates driver's taste or driving orientation that appears as an acceleration, and, in other words, the index indicates a so-called sports index. Thus, the index is based on an acceleration; however, the index does not vary in synchronization with an acceleration. In addition, the index varies with a variation in acceleration, so the index is usually configured to increase as the acceleration (including the absolute value of the acceleration; this also applies to the following description), and to decrease as the acceleration decreases reversely.

The control system according to the embodiment of the invention is configured to vary the index in response to the details of driving operation made by a driver in addition to the above described acceleration, and to vary the running characteristic of the vehicle. The operation, in short, is an operation for varying an acceleration exerted on the vehicle, and includes, for example, an accelerator operation, a brake operation, a steering operation, and the like. In the accelerator operation, the depression amount of an accelerator pedal is varied to vary the output power of a driving force source, such as an engine, or the speed ratio of a transmission. In the brake operation, braking force is varied. In the steering operation, the turning amount of the vehicle is varied. Then, the details of the operation include an operation amount and an operation speed.

In order to incorporate the above described running characteristic into actual vehicle running, the grip of tires needs to be sufficiently ensured. Then, in the embodiment of the invention, in order to obtain a desired running condition by ensuring the grip of the tires, the running characteristic based on the index is further corrected. Hereinafter, the specific example will be described. First, a vehicle to which the embodiment of the invention may be applied is a vehicle that accelerates, decelerates or turns through driver's operation, and the typical example is an automobile that uses an internal combustion engine or a motor as a driving force source. FIG. 7 is a block diagram that shows one example of the vehicle. The vehicle 1 includes four wheels consisting of two steered front wheels 2 and two driving rear wheels 3. Each of these four wheels 2 and 3 is assembled to a vehicle body (not shown) by a suspension device 4. Each suspension device 4, as well as a generally known suspension device, is principally formed of a spring and a shock absorber (damper). FIG. 7 shows the shock absorbers 5. Each shock absorber 5 causes cushioning action using the flow resistance of a fluid, such as gas and liquid, and is able to change the flow resistance by an actuator, such as a motor 6. That is, when the flow resistance of each shock absorber 5 is increased, the vehicle body is hard to squat down and provides a so-called stiff characteristic, and the behavior of the vehicle becomes less comfortable and provides an increased sporty feel. Note that the vehicle 1 may be configured to adjust the vehicle height by supplying or drawing pressurized gas to or from these shock absorbers 5.

Brake devices (not shown) are provided for the respective front and rear wheels 2 and 3. The brake devices are operable to apply braking force to the respective front and rear wheels 2 and 3 when a brake pedal 7 arranged at a driver seat is depressed.

The driving force source of the vehicle 1 is a generally known driving force source, such as an internal combustion engine, a motor and a combination of them. FIG. 7 shows an example of the vehicle 1 equipped with an internal combustion engine (engine) 8. A throttle valve 10 for controlling an intake air flow rate is arranged in an intake pipe 9 of the engine 8. The throttle valve 10 is an electronic throttle valve. The throttle valve 10 is, for example, opened or closed by an electrically controlled actuator 11, such as a motor, to thereby adjust the opening degree. Then, the actuator 11 operates in accordance with a depression amount of an accelerator pedal 12 arranged at the driver seat, that is, an accelerator operation amount, to thereby adjust the throttle valve 10 to a predetermined opening degree (throttle opening degree).

The correlation between an accelerator operation amount and a throttle opening degree may be appropriately set. As the correlation therebetween approaches a one-to-one correlation, the driver more strongly experiences a so-called direct feel and, therefore, the running characteristic of the vehicle becomes a sporty feel. In contrast, when the characteristic is set so that the throttle opening degree becomes relatively low against the accelerator operation amount, the running characteristic of the vehicle becomes a so-called mild feel. When the motor is used as a driving force source, a current controller, such as an inverter and a converter, is provided instead of the throttle valve 10. Then, the current controller is configured to adjust supplied current in accordance with an accelerator operation amount and to appropriately change the correlation of a current value with respect to an accelerator operation amount, that is, the running characteristic.

A transmission 13 is coupled to an output side of the engine 8. The transmission 13 is configured to appropriately change the ratio between an input rotational speed and an output rotational speed, that is, a speed ratio. The transmission 13 is, for example, a generally known transmission, such as a step-gear automatic transmission, a belt-type continuously variable transmission and a toroidal-type continuously variable transmission. Thus, the transmission 13 includes an actuator (not shown). The transmission 13 is configured to change the speed ratio in a stepwise manner or continuously by appropriately controlling the actuator. Specifically, a shift map that defines a speed ratio in correspondence with a state of the vehicle, such as a vehicle speed and an accelerator operation amount, is prepared in advance, and shift control is executed in accordance with the shift map. Alternatively, a target output is calculated on the basis of a state of the vehicle, such as a vehicle speed and an accelerator operation amount, a target engine rotational speed is obtained from the target output and an optimal fuel efficiency line, and then shift control is executed so as to attain the target engine rotational speed.

The vehicle is able to select fuel efficiency priority control or driving force increasing control over the above described basic shift control. Fuel efficiency priority control is control for upshifting at a relatively low vehicle speed or control for using a relatively high-speed-side speed ratio (low speed ratio) at a low vehicle speed. On the other hand, driving force increasing control or accelerating characteristic increasing control is control for upshifting at a relatively high vehicle speed or control for using a relatively low-speed-side speed ratio (high speed ratio) at a high vehicle speed. These controls may be executed, for example, in such a manner that a shift map is changed, a drive request amount is corrected or a calculated speed ratio is corrected. Note that a transmission mechanism, such as a torque converter equipped with a lock-up clutch, may be provided between the engine 8 and the transmission 13 where necessary. Then, an output shaft of the transmission 13 is coupled to the rear wheels 3 via a differential gear 14 that is a final reduction gear.

A steering mechanism 15 that steers the front wheels 2 will be described. The steering mechanism 15 includes a steering linkage 17 and an assist mechanism 18. The steering linkage 17 transmits the rotating motion of a steering wheel 16 to the right and left front wheels 2. The assist mechanism 18 assists the steering angle or steering force of the steering wheel 16. The assist mechanism 18 includes an actuator (not shown), and is able to adjust an assist amount assisted by the actuator. Thus, as the assist amount is reduced, the correlation between a steering force (or steering angle) and an actual turning force (or turning angle) of the front wheels 2 approaches a one-to-one correlation, and the driver experiences a so-called increased direct feel in steering, and the running characteristic of the vehicle becomes a so-called sporty feel.

Note that, although not specifically shown in the drawing, the vehicle 1 is equipped with an anti-lock brake system (ABS), a traction control system (TRC), vehicle stability control system (VSC), and the like, for stabilizing the behavior or attitude. The vehicle stability control system (VSC) comprehensively controls these systems. These systems are generally known. These systems are configured to decrease braking force exerted on the wheels 2 and 3 or exert braking force on the wheels 2 and 3 on the basis of a deviation between a vehicle body speed and a wheel speed and, additionally, control engine torque at the same time, thus preventing or suppressing a lock or slip of the wheels 2 and 3 to stabilize the behavior of the vehicle. In addition, the vehicle may be provided with a navigation system that is able to obtain data in connection with a running road or a planned running road (that is, running environment) and/or a switch for manually selecting a running mode, such as a sporty mode, a normal mode and a low fuel consumption mode (eco mode). Furthermore, the vehicle may include a four wheel drive mechanism (4WD) that is able to change the running characteristic, such as hill-climbing performance, accelerating performance and a turning characteristic.

Then, the vehicle includes various sensors that acquire data for controlling the engine 8, the transmission 13, the shock absorbers 5 of the suspension devices 4, the assist mechanism 18, the above described systems, and the like. The sensors are, for example, a wheel speed sensor 19, an accelerator operation amount sensor 20, a throttle opening degree sensor 21, an engine rotational speed sensor 22, an output rotational speed sensor 23, a steering angle sensor 24, a longitudinal acceleration sensor 25, a lateral acceleration sensor 26, a yaw rate sensor 27, and the like. The wheel speed sensor 19 detects the rotational speed of each of the front and rear wheels 2 and 3. The output rotational speed sensor 23 detects the output rotational speed of the transmission 13. The longitudinal acceleration sensor 25 detects a longitudinal acceleration (Gx). The lateral acceleration sensor 26 detects the acceleration in the lateral direction (transverse direction) (lateral acceleration Gy). Note that the acceleration sensors 25 and 26 may be shared with an acceleration sensor used in vehicle behavior control, such as the above anti-lock brake system (ABS) and vehicle stability control system (VSC), and, in the vehicle equipped with an airbag, the acceleration sensors 25 and 26 may be shared with an acceleration sensor provided for controlling deployment of the airbag. Furthermore, the longitudinal and lateral accelerations Gx and Gy may be obtained in such a manner that a value detected by an acceleration sensor inclined at a predetermined angle (for example, 45°) with respect to the longitudinal direction of the vehicle along a horizontal plane is decomposed into a longitudinal acceleration and a lateral acceleration. Furthermore, instead of detecting the longitudinal and lateral accelerations Gx and Gy by a sensor, the longitudinal and lateral accelerations Gx and Gy may be computed on the basis of an accelerator operation amount, a vehicle speed, a road load, a steering angle, and the like. These sensors 19 to 27 are configured to transmit detected signals (data) to an electronic control unit (ECU) 28. The electronic control unit 28 is configured to compute in accordance with those pieces of data and prestored data and programs and then output the computed results to the above described systems or the actuators of those systems as control command signals. Note that the resultant acceleration is not limited to an acceleration that includes acceleration components in the multiple directions, such as an acceleration that includes an acceleration component in the longitudinal direction of the vehicle and an acceleration component in the vehicle width direction (lateral direction); the resultant acceleration may be an acceleration in any one direction, such as only in the vehicle longitudinal direction.

The control system according to the embodiment of the invention is configured to incorporate the running condition of the vehicle into behavior control (running characteristic) over the vehicle. Here, the running condition of the vehicle is expressed by a longitudinal acceleration, a lateral acceleration, a yawing acceleration, a rolling acceleration or a resultant acceleration of some of these accelerations in the multiple directions. That is, when the vehicle is caused to run at a target speed or run in a target direction, or when the behavior of the vehicle, influenced by a running environment such as a road surface, is returned to an original state, accelerations in multiple directions usually occur. In consideration of this situation, a running environment or a driving orientation is conceivably incorporated in the running condition of the vehicle to some extent. On the basis of the above background, the control system according to the embodiment of the invention is configured to incorporate the running condition of the vehicle into behavior control over the vehicle.

As described above, the behavior of the vehicle includes an accelerating characteristic, a turning characteristic, a support characteristic of the suspension devices 4 (that is, the degree of bump/rebound and the tendency of occurrence of bump/rebound), the degree of rolling, the degree of pitching, and the like. The control system according to the embodiment of the invention includes the above running condition as a factor of a change of these running characteristics. In this case, the running characteristic may be changed by using an acceleration in any one of the directions or a resultant acceleration, which is an example of the above running condition; however, in order to further reduce a sense of strangeness, an index obtained by correcting those values may be used.

As an example of the index, a sports index (sports index (SPI)) will be described. Here, the sports index is an index that indicates a driver's intention or a running condition of a vehicle. The sports index that may be employed in the control system according to the embodiment of the invention is an index obtained by combining accelerations in multiple directions (particularly, absolute values thereof). The sports index is, for example, an acceleration that combines the longitudinal acceleration Gx and the lateral acceleration Gy as an acceleration significantly associated with the behavior in the running direction. For example, it may be calculated by instantaneous sports index $Iin=(Gx^2+Gy^2)^{1/2}$. Here, the acceleration is not limited to an acceleration detected by a sensor; it may be computed or estimated on the basis of driver's operation, such as an accelerator operation amount, a steering angle, a brake depression force and a depression amount of the brake pedal. In addition, the "instantaneous sports index Iin" means an index that is calculated on the basis of accelerations in the respective directions at an interval of each moment during running of the vehicle, and is a so-called physical quantity. Note that the "interval of each moment" means each time of repetition when detection of accelerations and calculation of an instantaneous sports index based on the detected accelerations are repeatedly executed at a predetermined cycle time.

In addition, within the longitudinal acceleration Gx used in the above mathematical expression, at least one of an accelerating acceleration and a decelerating acceleration (that is, deceleration) is desirably normalized or weighted and then used. That is, in a general vehicle, the decelerating acceleration is larger than the accelerating acceleration; however, the difference is almost not experienced or recognized by the driver. In most cases, the driver recognizes that the accelerating and decelerating accelerations are almost equivalent to each other. Normalization is a process of correcting such a difference between an actual value and a feel experienced by the driver, and is a process of increasing the accelerating acceleration or decreasing the decelerating acceleration (that is, the deceleration) for the longitudinal acceleration Gx. More specifically, normalization is a process of obtaining the ratio between the maximum values of the respective accelerations and then multiplying the ratio by the accelerating or decelerating acceleration. Alternatively, normalization is a weighting process of correcting the decelerating acceleration for the lateral acceleration. In short, as in the case where longitudinal driving force and lateral force that can be generated in tires are represented by a tire friction circle, normalization is a correction process of, for example, weighting at least one of forward and rearward accelerations so that the maximum accelerations in the respective directions are placed on a circle of a predetermined radius. Thus, through normalization and weighting, the degree of incorporation of the accelerating acceleration into the running characteristic is different from the degree of incorporation of the decelerating acceleration into the running characteristic. Then, as one example of weighting, the decelerating acceleration and the accelerating acceleration are weighted so that, between the decelerating acceleration in the longitudinal direction of the vehicle and the accelerating acceleration in the longitudinal direction of the vehicle, the degree of influence of the accelerating acceleration is relatively larger than the degree of influence of the decelerating acceleration. Note that the lateral acceleration may be larger than the accelerating acceleration, so the lateral acceleration may also be subjected to normalization.

In this way, an actual acceleration and a feel experienced by the driver are different from each other depending on the direction of the acceleration. For example, there is conceivably such a difference between an acceleration in the yawing direction or rolling direction and a longitudinal acceleration. Then, in the control system according to the embodiment of the invention, the control system may be configured to vary the degree of incorporation of each of accelerations in different directions into the running characteristic, in other words, to vary the degree of change in running characteristic based on an acceleration in any one of the directions from the degree of change in running characteristic based on an acceleration in another direction.

Figure 4:
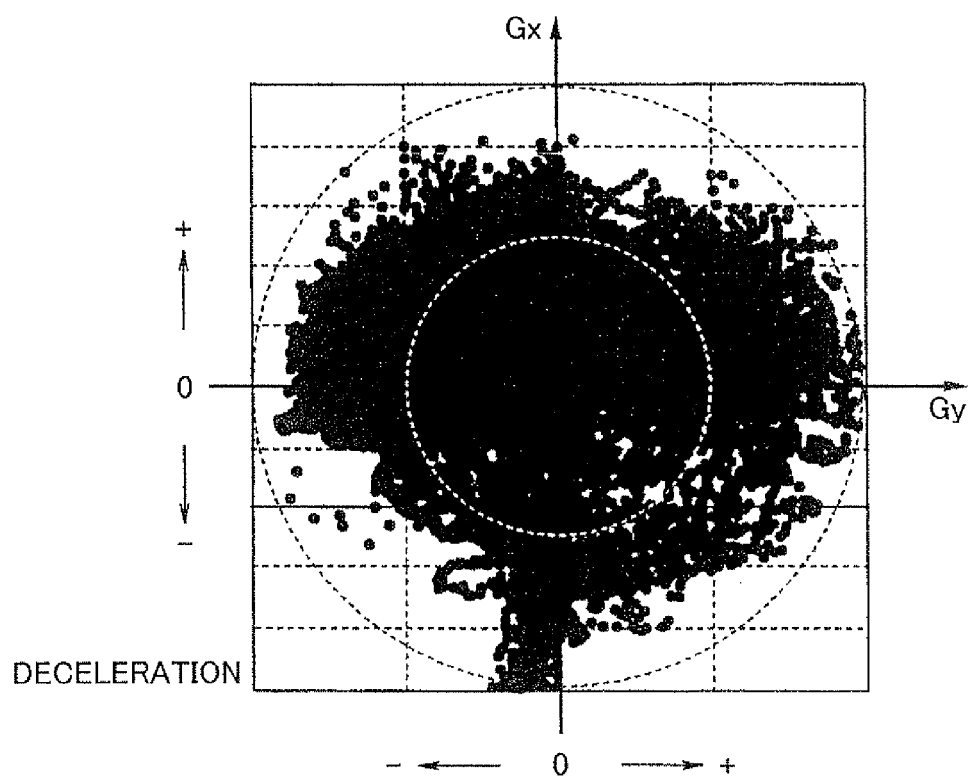
FIG. 4 is a graph that shows detected longitudinal accelerations and detected lateral accelerations that are plotted on a tire friction circle.

FIG. 4 shows an example of a tire friction circle on which the lateral accelerations Gy detected by the sensor and the normalized longitudinal accelerations Gx are plotted. This is an example when a vehicle runs on a test course that simulates an ordinary road. It appears that the frequency of an increase in lateral acceleration Gy is high when the vehicle significantly decelerates; however, both the longitudinal acceleration Gx and the lateral acceleration Gy generally tend to occur along the tire friction circle.

Figure 5:
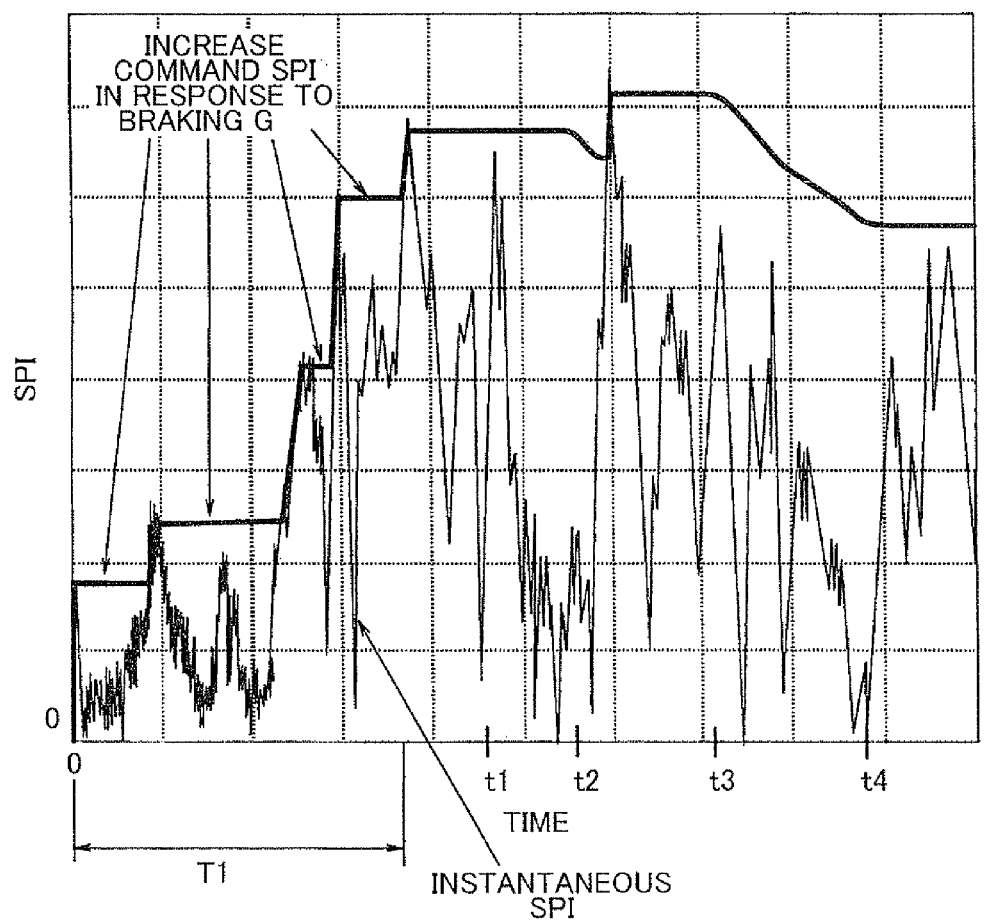
FIG. 5 is a graph that shows an example of a variation in a command sports index based on an instantaneous sports index.

In the control system according to the embodiment of the invention, a command sports index Iout is obtained from the above described instantaneous sports index Iin. The command sports index Iout is an index used in control for changing the running characteristic, and is configured to immediately increase with an increase in instantaneous sports index Iin that is a base for calculating the command sports index Iout and to contrarily decrease with a delay from a decrease in instantaneous sports index Iin. Particularly, the command sports index Iout is configured to decrease because of a factor that a predetermined condition is satisfied. FIG. 5 shows a variation in command sports index Iout obtained on the basis of a variation in instantaneous sports index Iin. In the example shown here, the instantaneous sports index Iin is indicated by values plotted in FIG. 4; whereas, the command sports index Iout is set at a local maximum value of the instantaneous sports index Iin and is kept at the last value until a predetermined condition is satisfied. That is, the command sports index Iout is an index that quickly increases and relatively slowly decreases.

More specifically, for example, when the vehicle brakes or turns during a period T1 after a start of control in FIG. 5, the instantaneous sports index Iin obtained by the variation in the acceleration increases or decreases; however, the instantaneous sports index Iin that is larger than the last local maximum value occurs before the above described predetermined condition is satisfied, so the command sports index Iout increases in a stepwise manner. In contrast, at t2 or t3, for example, when the vehicle shifts from acceleration during turning to acceleration during running straight ahead, the command sports index Iout decreases because a condition for decreasing the command sports index Iout is satisfied. In this way, in short, the condition for decreasing the command sports index Iout is satisfied if holding the command sports index Iout at the last large value does not meet a driver's intention. In the embodiment of the invention, the condition for decreasing the command sports index Iout is configured to be satisfied on the basis of a lapse of time.

That is, the situation that holding the command sports index Iout at the last large value does not meet a driver' intention is that a deviation between the held command sports index Iout and the instantaneous sports index Iin generated during then is relatively large and this situation is continuing and accumulating. Thus, the command sports index Iout is not decreased by the instantaneous sports index Iin caused by an operation that the driver temporarily returns the accelerator pedal 12 in the case where turning acceleration control is executed, or the like, but the condition for decreasing the command sports index Iout is satisfied when it has been a predetermined period of time since the instantaneous sports index Iin, caused by an operation that the driver continuously returns the accelerator pedal 12 in the case where the vehicle gently decelerates, or the like, is lower than the command sports index Iout. In this way, the condition for decreasing the command sports index Iout may be a duration during which the instantaneous sports index Iin is lower than the command sports index Iout. In addition, in order to accurately incorporate an actual running condition into the command sports index Iout, it is applicable that the condition for decreasing the command sports index Iout is satisfied when a time integral value (or an accumulated value) of a deviation between the held command sports index Iout and the instantaneous sports index Iin reaches a predetermined threshold. Note that the threshold may be appropriately set by a driving test or simulation conducted in line with a driver's intention or the result of a research based on an experience in actual vehicle. When the latter time integral value of the deviation is used, the command sports index Iout is decreased in consideration of a period of time and a deviation between the command sports index Iout and the instantaneous sports index Iin, so control for changing the running characteristic into which an actual running condition or a behavior is further adequately incorporated is possible.

Note that, in the example shown in FIG. 5, a period of time during which the command sports index Iout is held up to t2 is longer than a period of time during which the command sports index Iout is held up to t3; however, this is because the following control is configured to be performed. That is, the command sports index Iout is increased and held at the last stage of the above described period T1 and, after that, the instantaneous sports index Iin increases at t1 before the above described condition for decreasing the command sports index Iout is satisfied, and then the integral value of a deviation between the held command sports index Iout and the instantaneous sports index Iin is lower than or equal to a predetermined value. Note that the predetermined value may be appropriately set by a driving test or simulation conducted in line with a driver's intention or in consideration of a calculation error of the instantaneous sports index Iin. In this way, the fact that the instantaneous sports index Iin is close to the held command sports index Iout means that the running condition at that time is placed in the accelerating/decelerating condition and/or turning condition that causes the instantaneous sports index Iin based on which the held command sports index Iout is determined or in a condition close to that. That is, even when a certain period of time has elapsed after the time at which the command sports index Iout is increased to the held value, the running condition is approximate to the running condition at the time before a lapse of the period of time. Therefore, even when the instantaneous sports index Iin is lower than the command sports index Iout, the duration for satisfying the above described condition for decreasing the command sports index Iout is extended so as to hold the last command sports index Iout. Control or process for extending the duration may be performed in such a manner that the above described integral value (accumulated value) of an elapsed time or integral value of the deviation is reset and then accumulation of an elapsed time or integration of the deviation is resumed, the accumulated value or integral value is reduced by a predetermined amount, or accumulation or integration is interrupted for a constant period of time, or the like.

Figure 6:
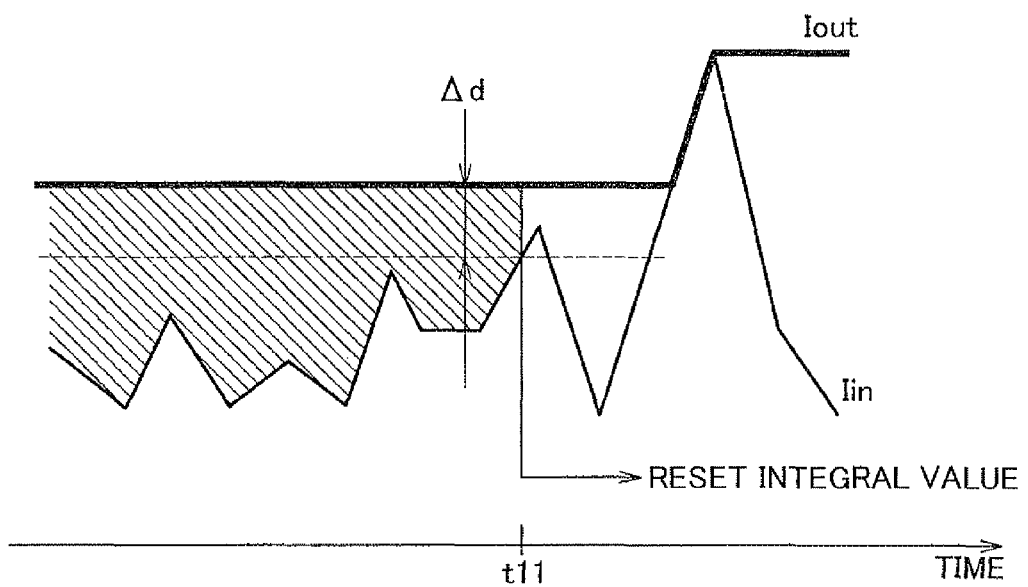
FIG. 6 is a graph for illustrating the time integral of a deviation between the instantaneous sports index and the command sports index and a situation in which the integral value is reset.

FIG. 6 is a schematic time chart of illustrating the above described integration of the deviation and the reset of the integral value. The hatched area in FIG. 6 corresponds to the integral value of the deviation. In this process, the integral value is reset at t11 at which a deviation between the instantaneous sports index Iin and the command sports index Iout is smaller than or equal to a predetermined value Δd and then integration of the deviation is started again. Thus, the condition for decreasing the command sports index Iout is not satisfied, so the command sports index Iout is kept at the last value. Then, after, resuming integration, as the instantaneous sports index Iin becomes larger than the held command sports index Iout, the command sports index Iout is updated to the large value corresponding to the instantaneous sports index Iin, the updated command sports index Iout is held, and then the integral value is reset.

When it is determined whether the condition for decreasing the command sports index Iout is satisfied on the basis of the above integral value, the degree or inclination of decrease in command sports index Iout may be varied. The above described integral value is obtained by integrating a deviation between the held command sports index Iout and the instantaneous sports index Iin with respect to time. Therefore, when the deviation is large, the integral value reaches the predetermined value in a short period of time, and then the condition for decreasing the command sports index Iout is satisfied. On the other hand, when the deviation is small, the above described integral value reaches the predetermined value in a relatively long period of time, and then the condition for decreasing the command sports index Iout is satisfied. Therefore, when the condition for decreasing the command sports index Iout is satisfied in a short period of time, the width of decrease in instantaneous sports index Iin with respect to the held command sports index Iout is large, so the command sports index Iout significantly deviates from the driver's intention at that point in time. Then, in such a case, the command sports index Iout is decreased at a large rate or a large inclination. In contrast, when a period of time elapsed until the condition for decreasing the command sports index Iout is satisfied is relatively long, the width of decrease in instantaneous sports index Iin with respect to the held command sports index Iout is small, so the command sports index Iout may not significantly deviate from the driver's intention at that point in time. Then, in such a case, the command sports index Iout is slowly decreased at a small rate or a small inclination. By so doing, a deviation between the command sports index Iout for setting the running characteristic and a driver's intention is quickly and accurately corrected, and the running characteristic of the vehicle may be set so as to be adapted to the running condition. Thus, when the command sports index Iout is decreased, the degree or inclination of decrease in command sports index Iout may be varied in accordance with an elapsed time during which the command sports index Iout has been held.

The above described command sports index Iout is determined from the instantaneous sports index Iin calculated on the basis of the above described so-called actual acceleration or estimated acceleration. The command sports index Iout indicates the running condition of the vehicle, and includes a running environment, such as a road surface gradient, the presence or absence of a corner and the curvature of the corner, and a driver's driving orientation. This is because the acceleration of the vehicle varies depending on the condition of a running road and an accelerating/decelerating operation is conducted by the driver on the basis of the condition of the running road and then the acceleration varies in accordance with the accelerating/decelerating operation. The control system according to the embodiment of the invention is configured to utilize the command sports index Iout for control over the running characteristic of the vehicle. In addition, the running characteristic in the control system according to the embodiment of the invention includes an accelerating characteristic, a steering characteristic, a suspension characteristic, a sound characteristic, and the like. These characteristics may be appropriately set in such a manner that the above described control characteristic of the throttle valve 10, the shift characteristic of the transmission 13, the damping characteristic of the shock absorber 5 of each suspension device 4, the assist characteristic of the assist mechanism 18, and the like, are changed by the associated actuators. A change in the running characteristic is generally such that, as the command sports index Iout increases, the vehicle is able to achieve so-called more sporty running.

The control system according to the embodiment of the invention changes at least one of the drive characteristic and chassis characteristic of the vehicle on the basis of the above described command sports index Iout, and is desirably configured to change both the drive characteristic and chassis characteristic of the vehicle to obtain a running characteristic adapted to a driving orientation. The control system is configured to obtain a required maximum acceleration rate, as an example of the drive characteristic, on the basis of the command sports index Iout and then to set a speed ratio or gear on the basis of the required maximum acceleration rate. Here, the required maximum acceleration rate defines a margin driving force. For example, the required maximum acceleration rate 100% indicates a state where the potential maximum acceleration of the vehicle is possible, and means to set the transmission 13 at a speed ratio at which the engine rotational speed is maximal or the highest speed ratio (speed ratio at the lowermost vehicle speed side). In addition, for example, the required maximum acceleration rate 50% indicates a state where a half of the potential maximum acceleration of the vehicle is possible, and means to set the transmission 13 at an intermediate speed ratio. In addition, a required maximum acceleration rate is predetermined for each vehicle or each type of vehicle, and a command sports index Iout is used to vary the predetermined required maximum acceleration rate (that is, the basic characteristic in driving force control). Specifically, the basic characteristic is varied so that, as the command sports index Iout increases, driving force increases, that is, the required maximum acceleration rate increases. In other words, the amount of change in driving force basic characteristic increases with an increase in command sports index Iout.

In addition, the chassis characteristic includes the vehicle body support characteristic or damper characteristic of the suspension mechanism, the steering characteristic that is the amount of turn with respect to a steering amount or a yaw rate. When the command sports index Iout is large, these chassis characteristics are varied so that the behavior of the vehicle becomes quick. For example, as the command sports index Iout increases, the damper characteristic is made stiff to suppress a squat or jump of the vehicle. In addition, the steering characteristic is varied so that the correlation between the steering amount and the turning angle approaches a one-to-one correlation and, therefore, the driver more strongly experiences a so-called direct feel. In other words, the amount of change for bringing the vehicle body support characteristic into a so-called sporty characteristic increases with an increase in command sports index Iout.

The reason why the function of the running characteristic of the vehicle that is set in this way is exercised when the vehicle is actually running is that there is sufficient grip of tires. Then, the control system according to the embodiment of the invention is configured to correct the running characteristic on the basis of a road surface μ that is significantly associated with grip of tires. FIG. 1 is a conceptual flowchart that shows the basic configuration of the correction control. In this example, a decrease in detected road surface μ, operating a snow mode switch (snow mode SW) and loading a low road surface μ obtained through learning control are employed as information associated with a road surface μ (hereinafter, referred to as road surface μ information). As described above, an instantaneous sports index Iin is calculated from an acceleration that arises from running of the vehicle, that is, running condition, an accelerator operation amount or steering amount that changes the behavior of the vehicle, such as a vehicle speed and a running direction, and the like, and, when there is the road surface μ information, the instantaneous sports index Iin is corrected (step S1). In the specific example described here, when the acceleration (which may be the resultant acceleration) of the vehicle is large, the running characteristic is set so as to smooth sporty running. For example, the control characteristic of the engine 8 or the transmission 13 is set so that driving force is relatively large or the support characteristic (for example, damper characteristic) of the vehicle body is set to a relatively stiff characteristic so as not to cause bump/rebound. In contrast to this, when there is information that indicates that the road surface μ is low, the driving force of the vehicle is desirably relatively small, so the instantaneous sports index Iin is corrected so as to reduce or suppress sporty characteristic. In the above described example, the instantaneous sports index Iin is decreased. Then, the instantaneous sports index Iin is computed on the basis of the correction amount (step S2). That is, the instantaneous sports index Iin is determined.

As described above, when the command sports index Iout is calculated on the basis of the instantaneous sports index Iin, the running characteristic of the vehicle is set on the basis of the command sports index Iout. Thus, when there is the road surface μ information, the command sports index Iout may be corrected in addition to or instead of correcting the instantaneous sports index Iin (step S3). When the road surface μ information indicates that the road surface μ is low, the details of the correction are to reduce or suppress sporty driving force characteristic as in the case of the above described correction of the instantaneous sports index Iin. Then, the command sports index Iout is computed on the basis of the correction amount (step S4). That is, the command sports index Iout is determined. Note that, when the instantaneous sports index Iin is corrected to reduce, a command sports index Iout that is determined on the basis of the corrected instantaneous sports index Iin may be relatively small, so, in such a case, correction in step S3 may not be executed.

Furthermore, the chassis characteristic is corrected (step S5). The chassis characteristic is a characteristic that controls the behavior of the vehicle, such as the support characteristic (more specifically, damper characteristic) of the vehicle body, provided by the suspension mechanism, and the steering characteristic of the steering device, and, when there is the road surface μ information, the chassis characteristic obtained on the basis of the command sports index Iout is corrected. When the road surface μ is low, the behavior of the vehicle is stable when the dampers of the suspension mechanism are relatively stiff, and the driver easily steers the vehicle when the correlation between the steering amount and the turning angle approaches a one-to-one correlation to make the driver experience a so-called direct feel, so the chassis characteristic may be corrected to a characteristic that smoothes more sporty running in this case. Then, the chassis characteristic is computed on the basis of the correction amount (step S6). This computation, for example, obtains a command amount by which the degree of change in the damping characteristic of the dampers is instructed.

That is, the driving force characteristic is corrected on the basis of the road surface μ information (step S7). The driving force characteristic is a characteristic that determines driving force generated by driving wheels in response to acceleration operation, and, when sporty running is required because of a large command sports index Iout, the driving force characteristic is changed so as to be able to generate large driving force.

In step S7, the driving force characteristic set on the basis of the command sports index Iout is corrected. When the vehicle enters onto a compacted snow road surface from a dry paved road surface during running, there is a high possibility that the tires slip when the generated driving force of the tires is large, so, in order to avoid this situation, the driving force characteristic is corrected so as to generate small driving force in step S7. The driving force characteristic is, for example, corrected to reduce the above described required maximum acceleration rate or corrected to a characteristic suitable for so-called comfort running, such as a characteristic that uses a low speed ratio. Then, the driving force characteristic is computed on the basis of the correction amount (step S8). This computation obtains a command amount for changing into a throttle opening degree map in which the throttle opening degree is relatively small against the accelerator operation amount or changing a shift map that uses a relatively lower speed ratio.

Note that the above described corrections may be a correction such that a predetermined constant correction amount is set in response to road surface μ information or a different correction amount is set on the basis of the degree of road surface μ information.

Figure 2:
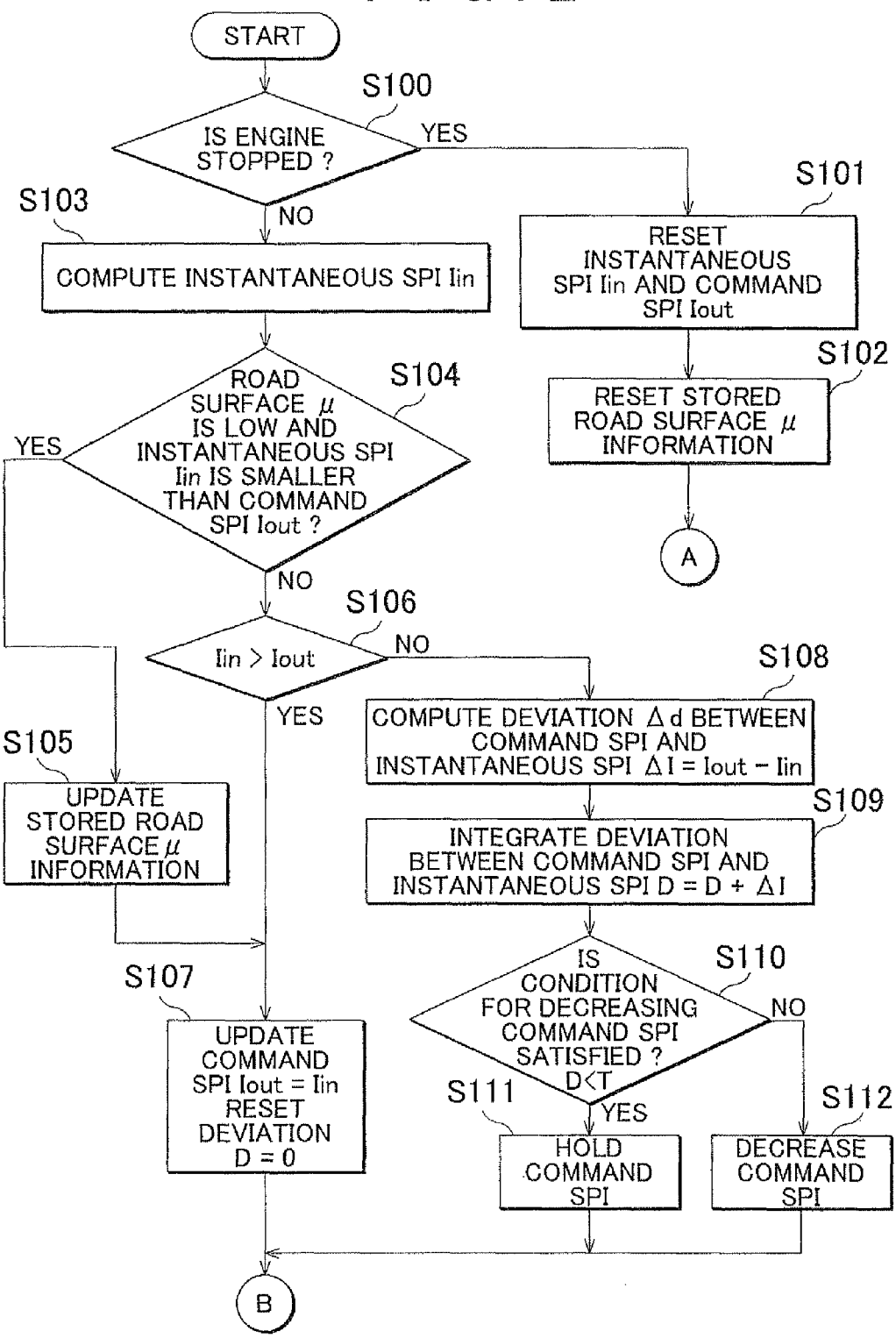
FIG. 2 is a first half of a flowchart for illustrating a specific example of control executed by the control system according to the embodiment of the invention.
Figure 3:
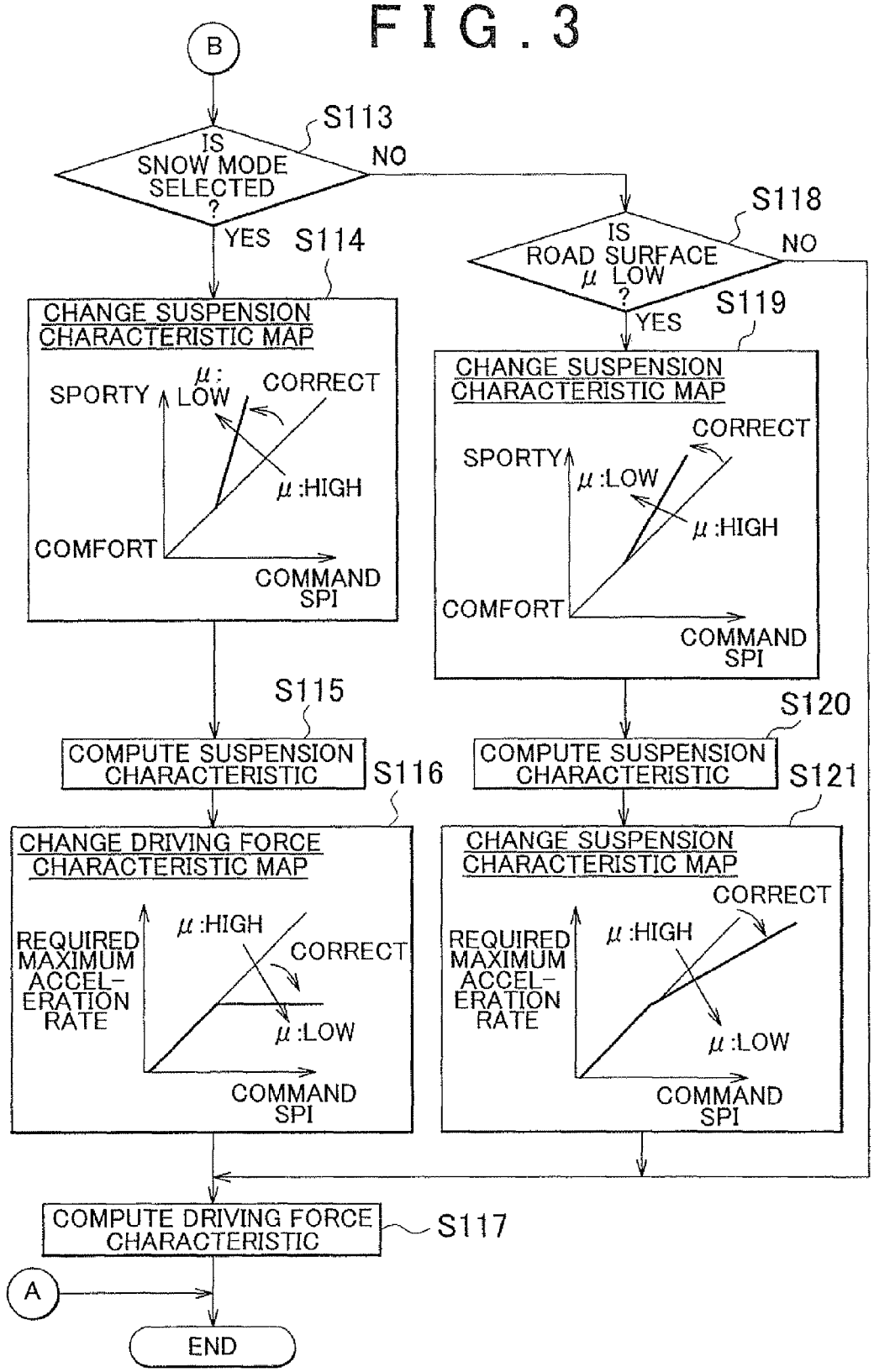
FIG. 3 is a second half of the flowchart.

FIG. 2 and FIG. 3 are flowcharts that show a control example that more specifically illustrates the control shown in FIG. 1. In the control example shown here, first, it is determined whether the engine 8 is stopped (step S100). This determination may be made on the basis of the fact that the rotational speed of the engine 8 is zero, no fuel injection signal is output, a main switch of the vehicle is turned off, and the like. When affirmative determination is made in step S100 because the engine 8 is stopped, the already obtained instantaneous sports index Iin and command sports index Iout are reset to zero (step S101), and, in addition, the already stored road surface μ information is reset (step S102), after which the routine once ends.

In contrast to this, when negative determination is made in step S100 because the engine 8 is in operation, the instantaneous sports index Iin is computed (step S103). A method of calculating the instantaneous sports index Iin is already described above. Subsequently, it is determined whether the road surface μ is low and the instantaneous sports index Iin is smaller than the already held command sports index Iout (step S104). The road surface μ is at least any one of a value calculated from a vehicle body speed and a wheel speed, and an already stored value. In addition, the command sports index Iout is already described with reference to FIG. 5 and FIG. 6. When affirmative determination is made in step S104 because the road surface μ is low and the instantaneous sports index Iin is smaller than the held command sports index Iout, it means that the road surface μ is different from the last road surface μ, so the stored road surface μ information is updated (step S105). After that, the process proceeds to step S107 (described later), the command sports index Iout is updated and corrected to the instantaneous sports index Iin, and then a deviation D is reset.

In contrast to this, when negative determination is made in step S104 because the road surface μ is not low, or the like, it is determined whether the instantaneous sports index Iin exceeds the held command sports index Iout (step S106). When affirmative determination is made in step S106, the command sports index Iout is updated to the instantaneous sports index Iin that exceeds the command sports index Iout, and then the deviation D is reset (step S107). The deviation D is the integral value of a deviation between the instantaneous sports index Iin and the held command sports index Iout when the instantaneous sports index Iin is smaller than the held command sports index Iout. Thus, updating of the command sports index Iout and resetting of the deviation D in step S107 are described with reference to FIG. 5 and FIG. 6.

On the other hand, when negative determination is made in step S106 because the instantaneous sports index Iin is smaller than or equal to the held command sports index Iout, the deviation ΔI is obtained (step S108). Then, the integral value D (=D+ΔI) is obtained (step S109). It is determined on the basis of the integral value D whether the condition for decreasing the command sports index Iout is satisfied (step S110). Specifically, as is described with reference to FIG. 5 and FIG. 6, it is determined whether the integral value D is smaller than a predetermined determination reference value T. Then, when affirmative determination is made in step S110 because the integral value D of the deviation falls below the determination reference value T, the current command sports index Iout is held (step S111). In contrast to this, when negative determination is made in step S110 because the integral value D of the deviation is larger than or equal to the determination reference value T, it means that the condition for decreasing the command sports index Iout is satisfied, so the command sports index Iout is decreased (step S112). A method of decreasing the command sports index Iout may be appropriately determined, and may be, for example, a method in which the command sports index Iout is continuously decreased at a constant inclination or decreased by a constant value in a stepwise manner, a method in which the inclination or constant value is varied in response to the command sports index Iout, or the like.

After the command sports index Iout is updated (step S107), held (step S111) or decreased (step S112) as described above, the process proceeds to step S113 shown in FIG. 3. That is, it is determined whether the snow mode is selected. As is generally known, the snow mode is a running mode that is set when the vehicle runs on a road having a low road surface μ, such as a compacted snow road. As an example, the snow mode is selected when a snow mode switch is turned on, and is a mode in which generated driving force is relatively small, for example, a high-speed-side speed ratio (low speed ratio) tends to be set.

When affirmative determination is made in step S113, the vehicle body support characteristic of the suspension mechanism is corrected to a characteristic suitable for more sporty running (step S114). The narrow solid line in step S114 of FIG. 3 indicates a characteristic that is obtained by changing the characteristic set in the design phase using the command sports index Iout, and the wide solid line indicates a characteristic that is corrected on the basis of the road surface μ information. As is apparent from this graph, when the road surface μ is assumed to be low or is low, a characteristic suitable for more sporty running is set. The characteristic of the suspension mechanism (suspension characteristic) is computed on the basis of the map corrected in this way (step S115). This is, for example, to calculate a command value by which the damping coefficient of the dampers of the suspension mechanism is increased to make the dampers relatively stiff.

In addition, the driving force characteristic map is changed (step S116). This is control by which driving force is corrected so as to relatively decrease from a value obtained on the basis of the command sports index Iout. For example, in a state where the required maximum acceleration rate is obtained on the basis of the command sports index Iout as indicated by the narrow solid line in step S116 of FIG. 3, when the road surface μ is assumed to be low or the road surface μ is low, the required maximum acceleration rate is corrected to a lower value as indicated by the wide solid line. The driving force characteristic is computed on the basis of the map corrected in this way (step S117). This is, for example, to calculate a command value for setting a relatively low speed ratio. After that, the routine once ends. That is, the vehicle body support characteristic is corrected to a characteristic suitable for more sporty running; whereas the driving force characteristic is corrected to a characteristic suitable for more comfort running. The directions in which both characteristics are corrected are opposite, so downshift into a low gear is suppressed or avoided.

On the other hand, when negative determination is made in step S113 because the snow mode is not selected, it is determined whether the road surface μ is low (step S118). The determination may be made on the basis of a variation in the road surface μ detected on the basis of a vehicle body speed and a wheel speed. When the negative determination is made, the process proceeds to the above described step S117, and then the driving force characteristic for a road surface of which the friction coefficient μ is not low is computed. In contrast to this, when affirmative determination is made in step S118 because the road surface μ is low, the suspension characteristic is corrected as in the case of the above described step S114 (step S119). Note that the degree of correction is suitable for a low road surface μ, and may be different from the above described correction in step S114. That is, the suspension characteristic is corrected to a characteristic suitable for more sporty running by changing the damper characteristic to a stiff characteristic. Then, the characteristic of the suspension mechanism (suspension characteristic) is computed on the basis of the thus corrected map (step S120). This control is similar to the above described control in step S115. Subsequently, the driving force characteristic is corrected as in the case of the above described step S116 (step S121). Note that the degree of correction is suitable for a low road surface μ, and may be different from the above described correction in step S116. After that, the process proceeds to the above described step S117, and then the driving force characteristic is computed, after which the routine once ends.

Eventually, with the above described control system according to the specific example, when obtained road surface μ information indicates that the road surface μ is low or is assumed to be low in a state where the index obtained from the running condition, that is, the command sports index Iout, indicates sporty running and the running characteristic corresponding to that command sports index Iout is set, the running characteristic is corrected to a characteristic suitable for a so-called low μ road. As a result, the running characteristic set on the basis of the index is changed to a characteristic suitable for a low μ road, so it is possible to easily achieve running adapted to a driving orientation as much as possible and also suitable for a low μ road.

While the disclosure has been explained in conjunction with specific exemplary embodiments thereof, it is evident that many alternatives, modifications, and variations will be apparent to those skilled in the art. Accordingly, exemplary embodiments of the disclosure as set forth herein are intended to be illustrative, not limiting. There are changes that may be made without departing from the scope of the disclosure.

What is claimed is:

1. A vehicle control system comprising a control unit that is constructed so as to:
obtain an index on the basis of a running condition of a vehicle;
change at least any one of a vehicle driving force control characteristic and a vehicle body support characteristic of a suspension mechanism in response to the index;

acquire information associated with a friction coefficient of a road surface on which the vehicle runs; and correct the at least any one of the vehicle driving force control characteristic and the vehicle body support characteristic, which is changed in response to the index, on the basis of the information associated with the friction coefficient of the road surface, wherein the index is configured to contrarily decrease with a delay from a decrease in an instantaneous index and is configured to immediately increase with an increase in the instantaneous index, the instantaneous index being calculated based on accelerations in a plurality of directions, each of the accelerations being calculated for a predetermined period in a respective direction while the vehicle is running.

2. The vehicle control system according to claim 1, wherein both the vehicle driving force control characteristic and the vehicle body support characteristic are corrected on the basis of the information associated with the friction coefficient of the road surface, and when the vehicle driving force control characteristic is corrected to change in a direction opposite to a direction in which the vehicle driving force control characteristic is changed on the basis of the index, the vehicle body support characteristic is corrected to change in the same direction as the direction in which the vehicle body support characteristic is changed on the basis of the index.

3. The vehicle control system according to claim 1, wherein the information associated with the friction coefficient of the road surface includes at least one of information that indicates a variation in the detected friction coefficient, information that indicates that a switch for selecting a running mode prepared for the vehicle to run on a road of which a road surface has a low friction coefficient is operated and information that indicates that a prestored friction coefficient is loaded.

4. The vehicle control system according to claim 1, wherein the index is increased when an absolute value of the instantaneous index is larger than an absolute value of a current instantaneous index, and is decreased when a state where the absolute value of the instantaneous index does not exceed the absolute value of the current instantaneous index continues and then a predetermined condition is satisfied, and the at least any one of the vehicle driving force control characteristic and the vehicle body support characteristic, which is corrected on the basis of the information associated with the friction coefficient of the road surface, is held until the index is decreased below a corrected value.

5. A vehicle control method comprising:

obtaining, by a processor, an index on the basis of a running condition of a vehicle;

changing, by the processor, at least any one of a vehicle driving force control characteristic and a vehicle body support characteristic of a suspension mechanism in response to the index;

acquiring, by the processor, information associated with a friction coefficient of a road surface on which the vehicle runs; and correcting, by the processor, the at least any one of the vehicle driving force control characteristic and the vehicle body support characteristic, which is changed in response to the index, on the basis of the information associated with the friction coefficient of the road surface, wherein the index is configured to contrarily decrease with a delay from a decrease in an instantaneous index and is configured to immediately increase with an increase in the instantaneous index, the instantaneous index being calculated based on accelerations in a plurality of directions, each of the accelerations being calculated for a predetermined period in a respective direction while the vehicle is running.

* * * * *